United States Patent
Tonnoir

(10) Patent No.: US 11,526,593 B2
(45) Date of Patent: Dec. 13, 2022

(54) AGGREGATOR OF IDENTIFICATION DEVICES

(71) Applicant: ELECTRICITE DE FRANCE, Paris (FR)

(72) Inventor: Sandrine Tonnoir, Saclay (FR)

(73) Assignee: ELECTRICITE DE FRANCE, Paris (FR)

( * ) Notice: Subject to any disclaimer, the term of this patent is extended or adjusted under 35 U.S.C. 154(b) by 259 days.

(21) Appl. No.: 16/956,030

(22) PCT Filed: Dec. 3, 2018

(86) PCT No.: PCT/EP2018/083385
§ 371 (c)(1),
(2) Date: Jun. 19, 2020

(87) PCT Pub. No.: WO2019/120971
PCT Pub. Date: Jun. 27, 2019

(65) Prior Publication Data
US 2021/0011988 A1   Jan. 14, 2021

(30) Foreign Application Priority Data

Dec. 19, 2017  (FR) ...................... 1762485

(51) Int. Cl.
*G06K 5/00*   (2006.01)
*G06F 21/35*   (2013.01)
(Continued)

(52) U.S. Cl.
CPC ............ *G06F 21/35* (2013.01); *G06F 21/602* (2013.01); *G06K 7/0004* (2013.01);
(Continued)

(58) Field of Classification Search
CPC ..... G06F 21/35; G06F 21/602; G06K 7/0004; G06K 7/10386; G07C 9/29; H02J 50/10
(Continued)

(56) References Cited

U.S. PATENT DOCUMENTS

| 5,402,095 A | 3/1995 | Janniere |
| 2007/0040017 A1 | 2/2007 | Kozlay |

(Continued)

FOREIGN PATENT DOCUMENTS

| CN | 101848217 A | 9/2010 |
| CN | 201725356 U | 1/2011 |

(Continued)

OTHER PUBLICATIONS

International Search Report and Written Opinion, dated Feb. 21, 2019, from corresponding/related International Application No. PCT/EP2018/083385.

*Primary Examiner* — Jamara A Franklin
(74) *Attorney, Agent, or Firm* — Nixon & Vanderhye

(57) ABSTRACT

A personal identification device for physical access control systems, including: at least one reader capable of reading data from an identification badge, the data including at least identification data; a processing unit; a data storage member; at least one wireless communication module; and an internal battery arranged to supply power to the components of the device. The processing unit is arranged for: acquiring data from at least one identification badge by way of the reader; storing the acquired data in the data storage member; if the acquired data are encrypted, decrypting the data; and transmitting at least a portion of the acquired data, via the wireless communication module and on request from a reader external to the device.

20 Claims, 4 Drawing Sheets

(51) Int. Cl.
*H02J 50/10* (2016.01)
*G07C 9/29* (2020.01)
*G06F 21/60* (2013.01)
*G06K 7/00* (2006.01)
*G06K 7/10* (2006.01)

(52) U.S. Cl.
CPC .......... *G06K 7/10386* (2013.01); *G07C 9/29* (2020.01); *H02J 50/10* (2016.02)

(58) Field of Classification Search
USPC .................. 235/382, 435, 451, 454, 380
See application file for complete search history.

(56) References Cited

U.S. PATENT DOCUMENTS

| | | | |
|---|---|---|---|
| 2008/0014867 A1 | 1/2008 | Finn | |
| 2009/0039156 A1* | 2/2009 | Brandli | G07C 9/257 |
| | | | 235/382 |
| 2012/0122520 A1* | 5/2012 | Phillips | H04M 1/21 |
| | | | 455/556.2 |
| 2012/0169462 A1 | 7/2012 | Park et al. | |
| 2013/0068366 A1* | 3/2013 | Eng | G06K 19/005 |
| | | | 156/60 |

FOREIGN PATENT DOCUMENTS

| | | |
|---|---|---|
| CN | 102708597 A | 10/2012 |
| CN | 202904648 A | 4/2013 |
| EP | 1 942 468 A1 | 7/2008 |
| KR | 10-2016-0047189 A | 5/2016 |
| WO | 2010/143162 A1 | 12/2010 |

* cited by examiner

US 11,526,593 B2

AGGREGATOR OF IDENTIFICATION DEVICES

BACKGROUND OF THE INVENTION

Field of the Invention

The invention relates to the field of physical access security systems, in particular those operating by means of electronic or magnetic keys.

Description of the Related Art

To control physical access to a location, it is common to replace mechanical locks with electronic systems, especially when the number of people to be verified is high. In general, a structure of centrally controlled and fixed locks is associated with the physical accesses, while electronic keys are entrusted to the users. The locks are therefore only unlocked upon the presentation of a valid key recognized by the fixed structure. Electronic keys often take the form of an identification badge specific to each user or group of users. The centralization of the structures makes electronic modifications quick and easy, including the rules associated with each electronic key. It is thus possible to make a new key valid or conversely to make a lost or stolen key inoperative. Such operations can be implemented without physical intervention on each lock included in the structure and without requiring the physical presence of the key. Such systems are, for example, implemented to secure access to business premises, common areas of collective housing, or public transport. US 2008/0014867 describes a device housing a plurality of electronic keys and forming an interface between the keys and a third-party device. However, such a device becomes unusable in the absence of the corresponding electronic keys.

Such systems are generally incompatible with each other. As a result, each person must have as many electronic keys as there are systems that he or she is called upon to use. Just like a set of mechanical keys, each person must have a set of electronic keys. This is inconvenient and cumbersome. In addition, in the event of the loss or theft of a rarely used key, a long period may pass before the loss or theft is declared and the key is neutralized (rendered inoperative) in the corresponding structure. This results in a risk of the lost/stolen key being used by a malicious person. Such situations can occur when operators must be able to access various sites using different and incompatible access systems, for example at sites of the same company that are geographically distant from one another. This type of problem tends to recur in a context where people are increasingly being required to change their geographic location frequently, in particular during business activity.

It is theoretically possible to make systems compatible with one another so that a key is recognized by several distinct systems. This involves modifying a large number of existing structures, which is technically complex, commercially improbable, and very expensive in practice.

The invention improves the situation.

SUMMARY OF THE INVENTION

A personal identification device is proposed for physical access control systems, comprising:
  at least one reader capable of reading data from an identification badge, said data including at least identification data,
  a processing unit,
  a data storage member,
  at least one wireless communication module, and
  an internal battery arranged to supply power to the components of the device.
The processing unit is arranged for:
  acquiring data from at least one identification badge by means of the reader,
  storing the acquired data in the data storage member,
  if the acquired data are encrypted, decrypting the data,
  transmitting at least a portion of the acquired data, via the wireless communication module and on request from a reader external to the device.

Such a device is self-sufficient in terms of power and makes it possible to store data contained in a plurality of electronic keys, or badges, particularly the identification data required to open the locks associated with the respective keys. Such a device can therefore be used in place of several electronic keys, independently of the technologies implemented by each of the systems. The original keys and badges are thus rendered unnecessary and can be put away without the user needing to keep them on hand. The original keys and badges may even be eliminated. Secondly, the data stored on the device can be selectively transmitted in a form suitable for readers in an existing structure, to enable identifying the user and opening the corresponding accesses. The device may further provide services in addition to that of physical access, for example by at least partially reproducing other data initially present on existing badges. This allows the wearer of the device to identify himself or herself in order to physically access areas of a site and also to access various services such as an internal network or a computer system, by means of existing electronic interfaces.

According to another aspect, the applicant proposes a method for aggregating personal identifiers on a device for physical access control systems, implemented by computer means. The method comprises:
  acquiring data from at least one identification badge by means of a reader (the aforesaid personal identification data),
  storing the acquired data on a data storage member,
  if the acquired data are encrypted, decrypting the data, and
  transmitting at least part of the acquired data, via a wireless communication module and in response to a request received from a third-party reader.

According to another aspect of the invention, the applicant proposes a computer program comprising instructions for implementing the method as defined herein when this program is executed by a processor. According to another aspect of the invention, the applicant proposes a non-transitory computer-readable storage medium on which such a program is stored.

The following features may optionally be implemented. They may be implemented independently of one another or in combination with one another:
  The device is in the form of a wearable object. This allows the user to interact with his or her environment without holding the device and while carrying out the usual functions of an inert badge such as being visually identified by operators.
  The device comprises a body in which is provided a housing of shapes and dimensions suitable for receiving at least one identification badge. The device can then also be used as a badge holder.
  A window is provided in the body of the device so that visual information carried by a badge placed in the housing remains at least partially visible through the window. This allows recognition by third parties while complying with rules or regulations in effect at the site being visited (in particular the color codes used on visitor badges).

The device comprises an electronic paper type of screen controlled by the processing unit. This makes it possible to display contextual information and/or visual elements at least partially repeating the visual elements of the original badge.

The at least one reader includes a radio tag reader and/or a magnetic stripe reader, and/or the at least one wireless communication module includes a magnetic stripe, a radio tag, a near-field communication module, a very short range communication module, or a combination of such elements. This makes the badge compatible with a wide variety of existing systems.

The processing unit is further arranged to encrypt the data stored in the data storage member. This reduces the risk of malicious use of the data if the device becomes accessible to a person other than the legitimate user.

The device further comprises an induction loop, such that the battery is rechargeable by induction. This makes it possible for the device to be compatible with induction charging systems and to dispense with the use of cable chargers.

The device further comprises an interface connected to the processing unit and user-activatable, the processing unit being further arranged to trigger the sending of a signal via at least one wireless communication module in response to activation of said interface. This makes it possible to give the wearer of the device access to services offered by the infrastructures and systems of the place being visited.

BRIEF DESCRIPTION OF THE DRAWINGS

Other features, details, and advantages of the invention will be apparent from reading the detailed description below, and from an analysis of the appended drawings in which.

DETAILED DESCRIPTION OF THE EMBODIMENTS

The drawings and description below essentially contain elements that are certain in nature. They can therefore not only serve to provide a better understanding of the invention, but also to contribute to its definition, where necessary.

Figure 1:
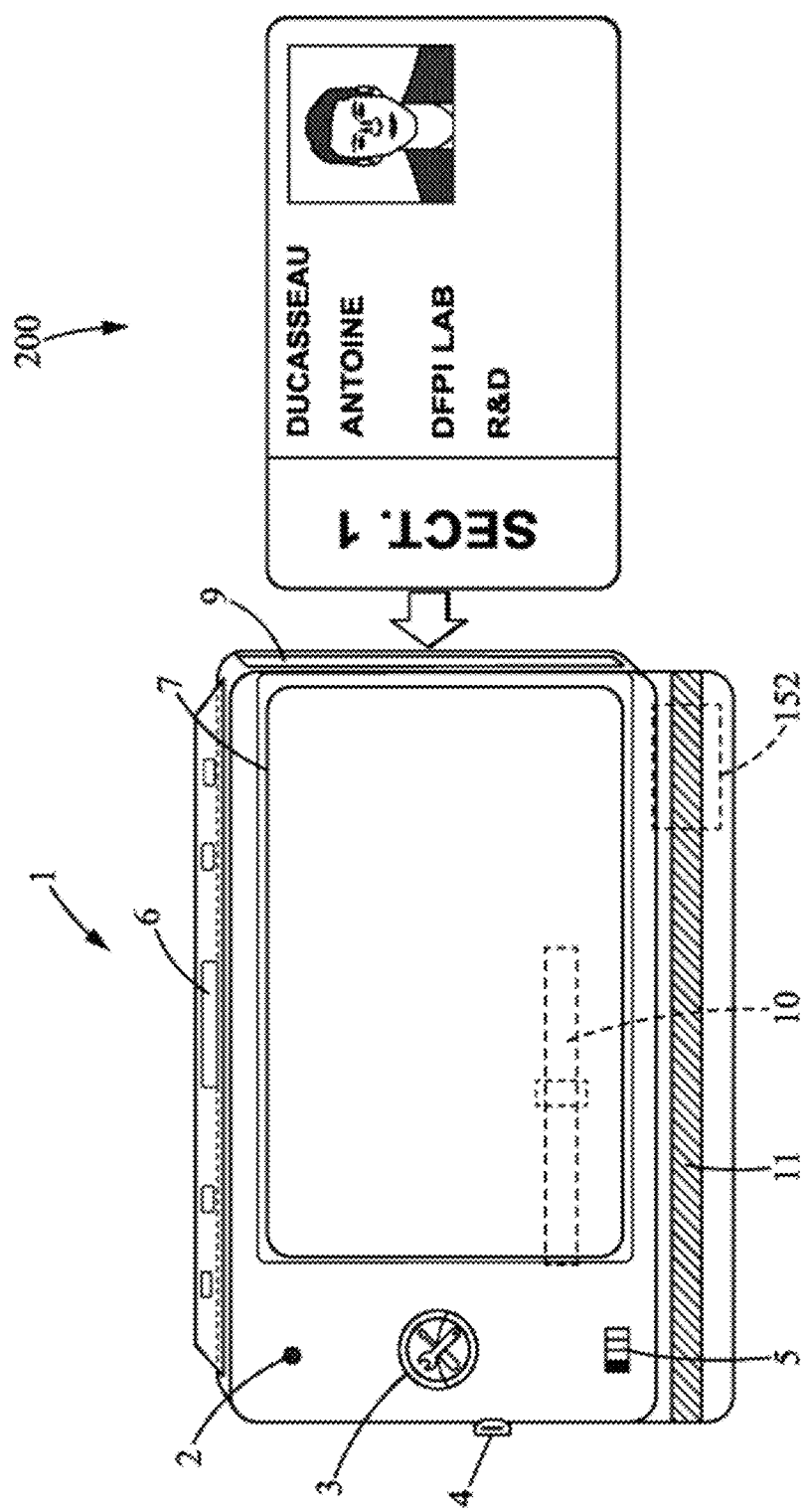
FIG. 1 shows an embodiment of a device according to the invention into which a pre-existing badge is being inserted.
Figure 2:
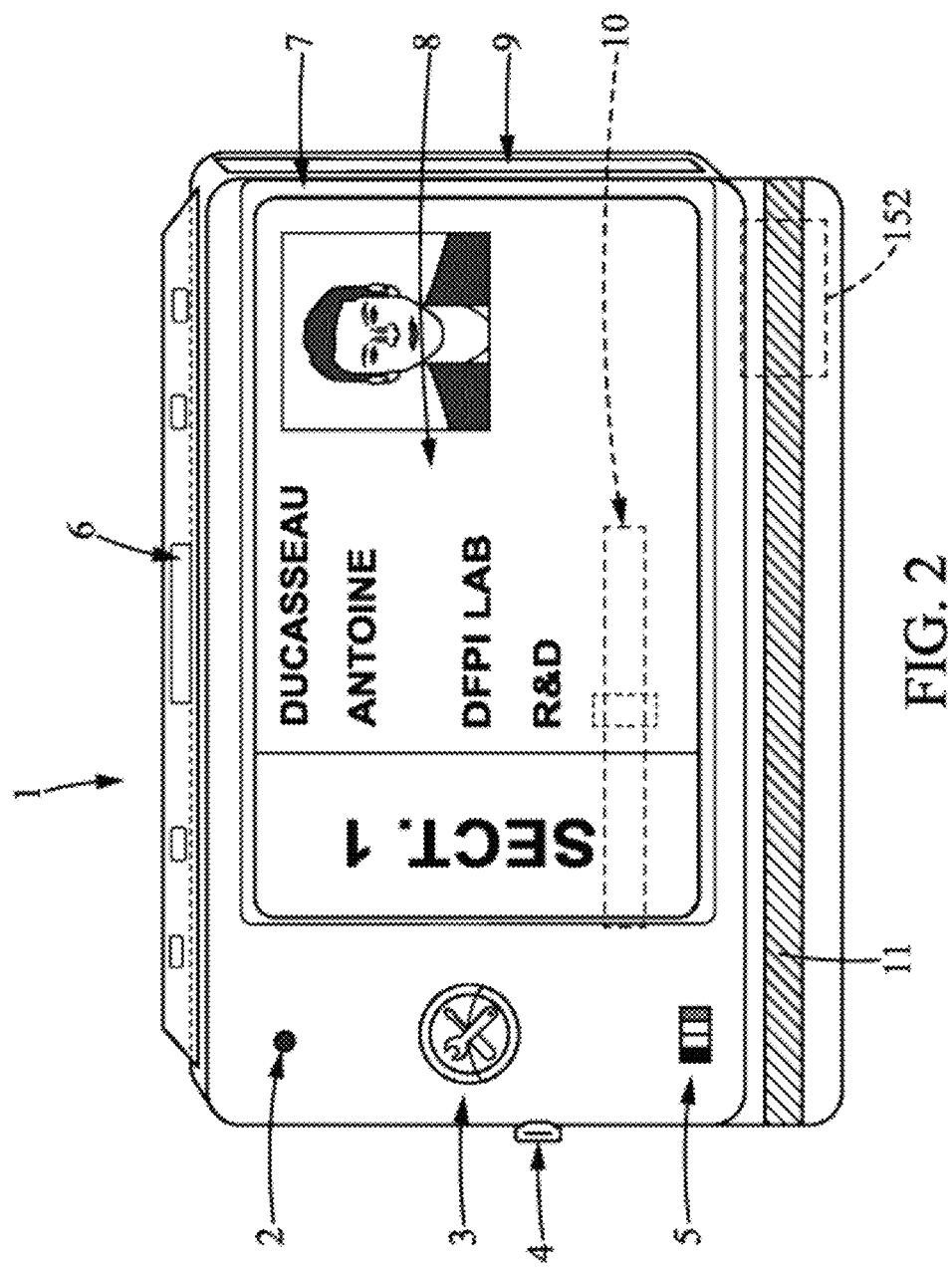
FIG. 2 shows the embodiment of FIG. 1 with the existing badge being held in the device.

FIG. 1 represents a personal identification device 1 next to which is arranged a badge 200. FIG. 2 represents the device 1 with the badge 200 inserted inside. The badge 200 comprises personal identification data. In the example described here, the badge 200 is the form of a substantially rectangular plastic card the size of a conventional payment card, meaning in accordance with ISO standard 7810: 85.60 by 53.98 millimeters. The badge 200 comprises a radio tag. The radio tag includes an electronic chip associated with an antenna. The chip stores identification data in particular. The identification data comprise a personal identifier, for example in the form of a number. In a variant, the identification data may include other information about a person (or "holder"). The data are accessible by a radio tag reader, via the antenna. Such a reader is able to send a request to the chip and to supply energy in magnetic form which allows the chip to send the required data in response, via the antenna. Such technology is known by the acronym "RFID" for "Radio Frequency Identification".

In some variants, badges in other forms besides a card may be compatible with the device 1. The badges for example are in the form of a one-piece object suitable for being hung on a ring with mechanical keys. In some variants, the badges comprise personal identification data stored and accessible by technology other than RFID. For example, the data may be stored in magnetic form. The badges may then include a magnetic stripe on a card-shaped support or on another type of support.

In the example described here, the badge 200 also bears visual information on at least one of its two faces, in particular relating to the identity of the user: last name, first name, job title, photo, and identification of the areas of a site which he or she is authorized to access.

In some embodiments, the device 1 is in the form of a wearable object. "Wearable" is understood here to mean that not only can the device 1 be carried in the hand but also and primarily carried by the user without using his or her hands. For example, the device 1 may be placed in a jacket or shirt pocket, be clipped to clothing, worn around the neck or wrist, etc. In the French version of this patent, the term "portable-sur-soi" is used as a replacement for "wearable" in the absence of another commonly accepted French equivalent.

In some embodiments, the device 1 comprises a body in which is provided a housing of shapes and dimensions suitable for receiving at least one badge 200. The device 1 thus makes it possible to aggregate the identification data electronically/by computer and further allows physically containing a badge or physically grouping a plurality of badges.

The device 1 shown in the figures comprises a body in the form of a "badge holder" type of housing or case. The example shown is therefore both wearable and capable of accommodating at least one badge 200. The device 1 here comprises an opening 6 of a shape and dimensions enabling the insertion of attachment accessories such as a cord, strap, or clip, so that the user can easily wear the device 1 without using his or her hands. The device 1 has a window 7, open or with transparent protection, so that the visual information carried by the badge 200 remains visible after the badge 200 is inserted into the device 1. The device 1 has a slot 9 of a shape and dimensions chosen so that the badge 200 is inserted into the body through the slot 9. In the example described here, the device 1 further comprises a member 10 for facilitating extraction of the badge 200, represented with dashed lines in FIG. 1. The member 10 is for example in the form of a tongue which enables pushing the badge 200 out of the device 1.

In some variants, the device 1 comprises a body of shapes and dimensions that differ from those of a badge holder. For example, the device 1 has shapes and dimensions suitable for accommodating badges other than cards or a plurality of badges of different shapes and dimensions.

In general, it is considered that in order to be considered as "wearable", the device has:

a limited bulk, for example maximum dimensions that are generally less than 12 centimeters, and preferably a substantially planar shape having a thickness of less than 10 millimeters, and a mass, including the battery, of less than 300 grams.

In the example described here, the device 1 further comprises a port 4, here of the "micro-USB" type. The port 4 enables electronic access to the internal components of the device 1 which will be described below. The port 4 also allows recharging a battery described in more detail below.

The device 1 further comprises a connection indicator 2. The connection indicator 2 forms a visual indicator of the status of the network as detected by the device 1. The device 1 further comprises a charge status indicator 5. The charge status indicator 5 forms a visual indicator of the charge status of the internal battery and allows the user to estimate the remaining autonomy of the device 1. The charge indicator 5 here is in the form of a set of diodes.

The device 1 further comprises an interface 3, here in the form of a button, activatable by the user. Activation of the interface 3 causes a signal to be sent from the device 1. The signal is sent via a wireless communication module described below. Such a signal may, for example, be an activation signal for compatible third-party equipment located near the device 1. For example, equipment located nearby and including a touch screen and/or speakers may, upon receiving the activation signal, activate and offer default services (for example displaying a site map) and/or dedicated services (selected based on the identification data transmitted by the device 1 to the third-party equipment in parallel with the activation signal). Such an interface may also be used in an emergency, for example to report an incident or trigger the dispatch of emergency services, and optionally to trigger geolocation. Different types of interactions may be provided for sending different signals (short, long, or repeated presses for example).

The device 1 comprises a magnetic stripe 11 arranged so that it can be read by a third-party stripe reader by swiping the device 1 through said third-party reader.

Figure 3:
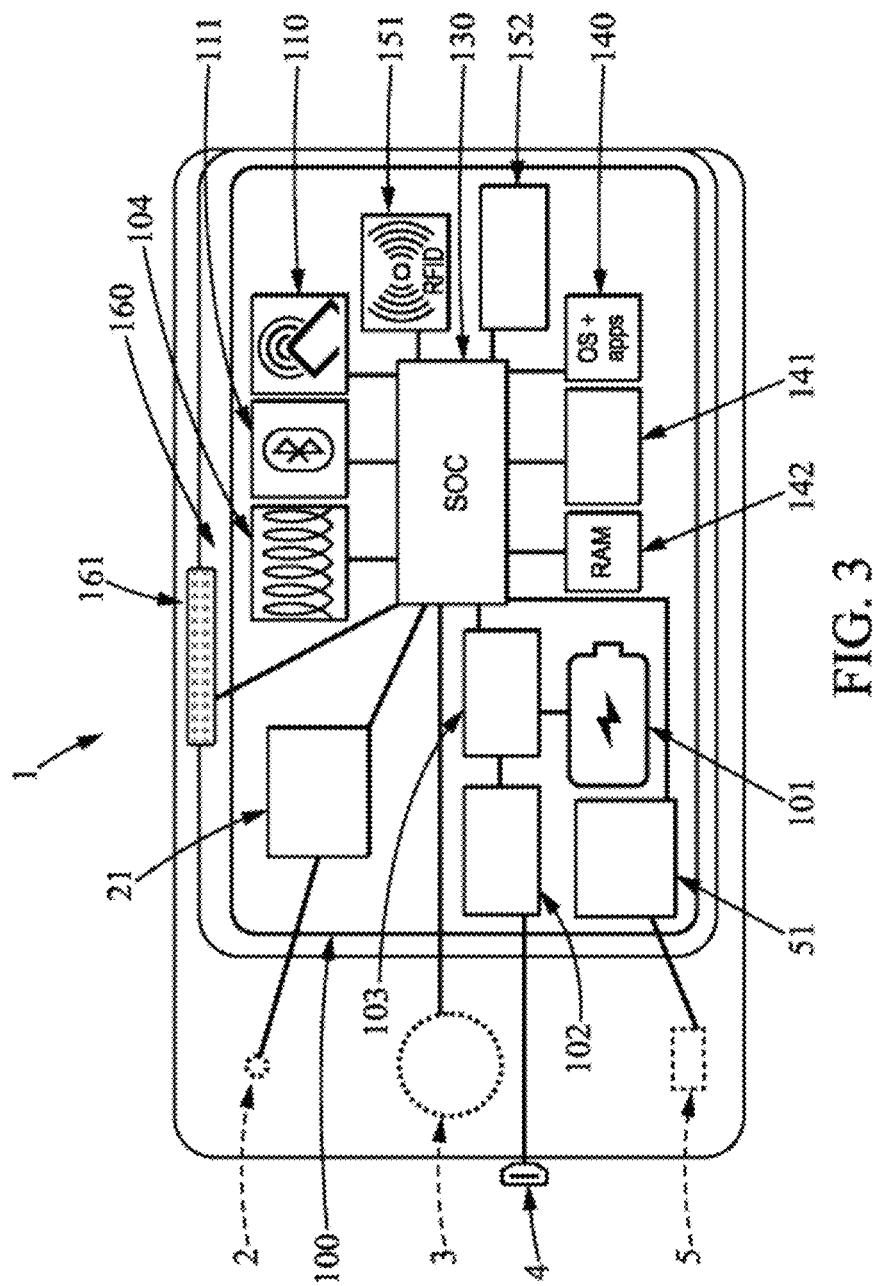
FIG. 3 is a schematic representation of components of a device according to the invention.

FIG. 3 represents an example of the internal architecture of the device 1. FIG. 3 schematically represents the functional elements of the device 1 and their interactions. FIG. 3 is not representative of the physical organization of the elements of the device 1. For example, two functional elements represented separately in FIG. 3 may be implemented by a shared hardware component of the device 1.

In general, the device comprises:
at least one reader capable of reading data from an identification badge,
a processing unit,
at least one data storage member,
at least one wireless communication module, and
an internal battery.

In the example described here and shown in FIG. 3, the device 1 comprises, in addition to the elements visible from the exterior and described in relation to FIGS. 1 and 2, a set 100 of internal elements (for example grouped on a circuit board):
the processing unit 130;
the internal battery 101;
an energy management module 103;
a control unit 102 for the port 4 (here micro-USB);
a controller 51 for the charge status indicator 5;
a controller 21 for the connection indicator 2;
an operating system 140;
two readers capable of reading data from an identification badge 200, namely:
a radio tag reader (RFID), and
a magstripe reader 152;
two data storage members, namely:
a long-term storage flash memory 141, and
RAM working memory 142;
four wireless communication modules, namely:
a magnetic stripe 11,
an active radio tag (RFID) coupled to an antenna,
a near-field communication (NFC) module 110,
a very short range communication module 111 (Bluetooth).

In the above list, distinction is made between the radio tag reader (RFID) and the active radio tag (RFID) coupled to an antenna, in order to distinguish between their respective functions. However, these elements may be structurally grouped together in a radiofrequency identification interface (RFID), referenced 151 in FIG. 3.

Each of the above elements is connected to the processing unit 130.

In the example described here, the port 4 in the form of a micro-USB port allows mechanical compatibility with a large number of existing devices, in particular computers, by means of a known cable widely used for such. In the example described here, the port 4 is further used as a socket for recharging the internal battery 101, by means of the control unit 102 and the energy management module 103. In some variants, the port 4 may be of another form, for example mini-AB USB, or even comply with standards other than USB. In the example described here, in addition to the port 4, the device 1 comprises another power input: an induction energy receiver 104, or induction loop, allowing wireless charging of the battery 101. When another means for recharging the battery is present, such as the port 4, such a receiver 104 is optional.

In some variants, the port 4 may be absent. In these cases, the exchange of data between the device 1 and third-party equipment may be carried out by means of at least one of the communication modules 110, 111 and/or by means of an additional wireless communication module, while power may be acquired by means of another input, such as the induction energy receiver 104.

In the example represented in FIG. 3, the device 1 further comprises an optional member: a screen 160 visible from the exterior and connected via a connector 161 to the processing unit 130. The screen 160 here is of the electronic paper type (or "e-paper") and makes it possible to display parameters of the device 1 while consuming little power.

Here, distinction is made between the operating system 140 and the flash memory 141 intended to store data, in particular identification data. In practice, the operating system and the other data may be stored in non-transitory storage media that are analogous to one another, or may even be stored on the same medium. For example, a single memory may be partitioned to store the data relating to the operating system 140 separately from the other data.

The processing unit 130 may also be called a controller. The processing unit 130 comprises at least one processor, for example in the form of a system on a chip or "SoC". All electronic components of the device 1 are connected to the processing unit 130. The processing unit 130 controls and manages all the electronic components and executes the software functions of the device 1. As the device 1 is designed to be occasionally connected to a source computer device, the software components of the device 1, including the operating system 140, can easily be updated, including by means of wireless communication modules 110, 111.

Readers able to read data from an identification badge 200 allow the device 1 to adapt to various types of existing badges 200, in particular to various technologies linked to existing physical access control systems. The plurality of readers allows the device 1, in particular the processing unit 130, to acquire data from badges of different types.

The radio tag reader (RFID) is arranged to request and receive data stored in a third-party RFID chip (of an RFID type badge 200) when the device 1 comes close to such a badge 200. The magstripe reader 152 is arranged to read data stored in magnetic form, for example in a third-party magnetic stripe (of a badge 200 with magnetic stripe) when the device 1 is close to such a badge 200.

The communication modules 11, 110, 111, 151, 152 allow the device 1 to adapt to various environments, in particular to various architectures and technologies of existing physical access control systems. For example, certain categories of electromagnetic waves may be prohibited in particular environments. The plurality of communication modules makes it possible to adapt the communications means used by the device 1, at will.

The magnetic stripe 11 is arranged so that it can be read by a third-party stripe reader by passing the device 1 through said reader. Thus a third-party magstripe reader can read the data stored in magnetic form by the device 1. The radio tag and the antenna of the RFID interface 151 are arranged to transmit the data stored in the chip when the device 1 is approached by a third-party RFID reader. A third-party RFID reader can thus read the data stored in the RFID chip of the device 1. The near-field communication (NFC) module 110 has a range that is generally less than 10 centimeters. It is arranged to transmit data stored in a storage member of the device 1, to a third-party NFC reader. In some embodiments, the module 110 may also form an NFC reader so that it is able to acquire data from a third-party NFC interface, for example in order to obtain identification data. The very short range communication module 111 has a range of generally less than 20 meters, for example according to Bluetooth standards. It is arranged to transmit data stored in a storage member of the device 1 to a third-party very short range communication module. In some embodiments, the module 111 may also form a Bluetooth reader so that it is able to acquire data from a third-party Bluetooth interface, for example in order to obtain identification data.

The cases where modules 110 and 111 are used as readers (for acquisition of identification data) can for example make it possible to render the device 1 compatible with an existing access control system, for example by presenting the device 1 at the reception desk of a site in order to store therein an identifier authorized for access, rather than by acquiring data from an existing badge, as existing badges are generally passive and without an active NFC or Bluetooth interface.

The energy management module 103 is arranged so as to control the charging of the battery 101, here by means of the port 4. The energy management module 103 is arranged so as to supply energy to the other components of the device 1. In the embodiments including an induction energy receiver 104, the module 103 is further arranged so as to control the charging of the battery 101 via the induction energy receiver 104.

The battery 101 and the energy management module 103 allow the device 1 to continue to operate independently of the availability of an external energy source. The device 1 can thus be arranged to be recharged by an external source, for example when temporarily plugged into the USB port of a computer or placed close to an induction recharging base (in the case of the induction receiver 104). The battery 101 also makes it possible to modify the data stored on the RFID chip without the need to connect the device 1 to a third-party device: the radio tag is therefore active, in contrast to passive radio tags that have no energy source.

The control unit 102 for the port 4, the controller 51 for the charge status indicator 5, and the controller 21 for the connection indicator 2, can be considered as sub-units of the processing unit 130 whose functions are limited to controlling their respective element (port 4, charge status indicator 5, and connection indicator 2). In other words, control is ensured by the processing unit 130 via the sub-units.

Operating system 140 designates the software used by the processing unit 130 to perform the functions described below. The operating system 140 is in the form of data stored in one of the data storage members.

The processing unit 130 is arranged for:
  acquiring data from at least one identification badge, for example badge 200, by means of a reader, for example the radio tag reader 151 or the magstripe reader 152,
  storing the acquired data in a data storage member, for example the flash memory 141,
  if the acquired data are encrypted, decrypting the data, for example by means of software components executed by a processor of the processing unit 130,
  transmitting at least a portion of the acquired data via a wireless communication module, for example the magnetic stripe 11, the radio tag (RFID) coupled to an antenna, the near-field communication (NFC) module 110, or the very short range communication module 111 (Bluetooth), and upon request from a reader external to the device 1, for example an RFID, NFC, or magnetic terminal.

In first examples, the aforementioned steps are carried out successively one after the other, without interruption. In other words, the data read are more or less immediately transmitted to a third-party reader. In these first examples, the preexisting badge 200 from which the data originate is in immediate proximity to the device 1, for example inserted inside the device 1 as shown in FIG. 2, or else in a pocket or a suitcase of the user when the reading technology allows contactless reading. In these examples, the user must therefore possess the badge 200 and have it accessible to the reader of the device 1 so that the processing unit 130 can relay the data to a third-party reader by means of a wireless communication module. The device 1 has the advantage of being able to convert, on the fly, the original signal of the badge 200 into a signal suitable for the third-party reader (the signal read and the signal transmitted may be identical to or different from each other). This makes it possible to render a badge 200 and a third-party reader compatible using technologies that are not directly compatible. For example, an operator with a badge of standard NFC technology at a first physical site can interact with a magstripe reader at another physical site using the same badge 200 and by means of the device 1.

In second examples, the above steps are carried out so that they are spaced apart over time. In other words, the data read are stored and optionally decrypted. Then, in a second phase, for example several minutes, hours, or days later, the stored data are decrypted if necessary, then transmitted to a third-party reader, for example at the request of said third-party reader. In these second examples, the preexisting badge 200 from which the data originates becomes useless once the storage operation has been carried out. The user can keep only the device 1 on his or her person. The device 1 shown in FIGS. 1 and 2 can therefore be used empty of any badge 200. The option of the screen 160 is then particularly advantageous as it makes it possible to reproduce any visual indications present on the original badge 200. The processing unit 130 may in particular implement the reading-storage steps several times with different badges 200. Then, in a second phase, the relative data from one of the badges 200 are transmitted to a third-party reader. The device 1 has the advantage of being able to convert the original signal of the badge 200 into a signal suitable for the third-party reader (identical or different signals). This makes it possible to render a badge 200 and a third-party reader compatible using technologies that are not directly compatible. This also makes it possible to free the user from the constraint of having to keep a plurality of badges on his or her person. For example, an operator needing to access different sites where different access control systems are installed can use the device 1 instead of each of the badges.

In the examples described here, the data received in readable form (unencrypted) are encrypted upon receipt by the processing unit 130, then stored for the long term in encrypted form in a data storage member such as the RAM working memory 142. For example, unencrypted data received are temporarily saved upon receipt by means of the flash memory 141. Then, the unencrypted data are deleted as soon as a corresponding encrypted version is stored for the long term.

Use of the device 1 in data acquisition mode is similar to that of a reader. For example, a badge 200 including a chip and an RFID antenna are brought closer to the radio-identification interface (RFID) 151 of the device 1 in order to trigger the reading and acquisition of data. A badge 200 including a magnetic stripe can be swiped along the magstripe reader 152 in order to trigger the reading and acquisition of data.

Preferably, the data decryption is carried out on the fly, meaning immediately before transmission to a third-party reader. The content of the readable (not encrypted) data is therefore not stored for a long period of time on the device 1.

The examples of RFID and magnetic stripes are the most common in existing systems. As a variant, other technologies for the communication of identification data may be integrated into the device 1, in addition to or as a replacement for the magnetic and/or RFID technologies.

In the example described here, the device 1 is further arranged to receive data, in particular identification data, via the port 4 and a third-party computer device. In this case, the existence of the original badge may be made superfluous. For example, a user equipped with the device 1 can present himself or herself as a visitor at the reception desk of a site. Identification data can then be exchanged between the device 1 and an existing third-party access control system, so that the identification data stored on the device 1 are then recognized by the various readers of the site's access security control system. It is thus unnecessary to provide a physical "visitor" badge. This reduces the issuance of physical badges. In addition, the embodiments of the device 1 enabling the display of visual identification data, such as the window 7 or screen 160, advantageously replace visitor badges which are generally blank or lack such visual information. Visual checks by operators on site are also facilitated.

Figure 4:
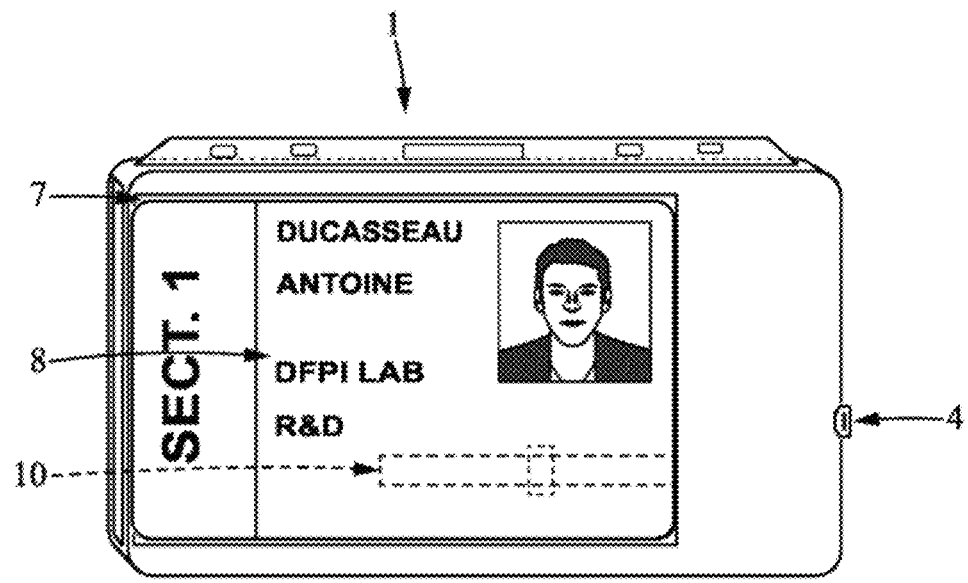
FIGS. 4 and 5 show two opposite faces of a device according to one embodiment of the invention.
Figure 5:
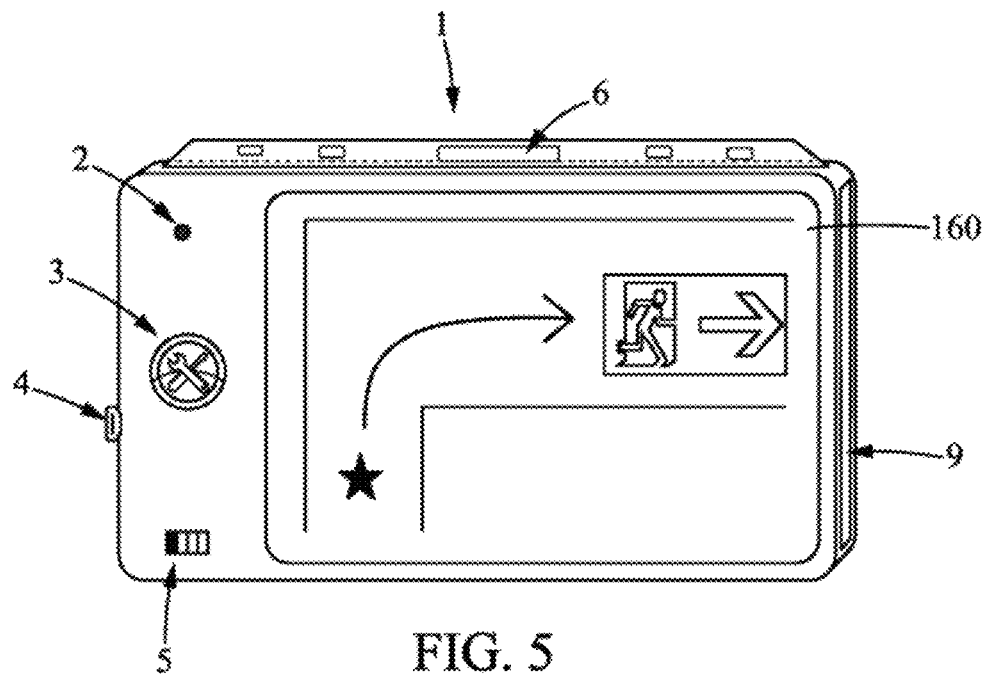

FIGS. 4 and 5 respectively represent a rear face and a front face of an embodiment of the device 1. Of course, nothing prevents the reverse use of the front and rear faces. Elements analogous to those of the embodiment in the preceding figures have the same reference numbers. In this example, the device 1 comprises a screen 160 of the electronic paper type extending over a major portion of its front face. This example illustrates the possibility of displaying information dynamically on the device 1 so as to improve its relevance according to the situation. The visual information of the badge 200 thus remains accessible and visible through the window 7 on the rear face, as in the embodiment of FIGS. 1 and 2, while on the front face contextual information is displayed. Contextual information includes, for example, a meeting place and time, meetings for the day, site-specific security information, events relevant to the site and date, laboratory visits, information relating to the particular services the user can access such as cafeterias, or even personalized guidance within the premises, for example for people having a disability or reduced mobility. In one variant, identification information may also be displayed by the screen 160, in particular when the badge 200 is absent or does not have such visual information.

Such a device 1 can be specific to the user while being compatible with the infrastructures of several different sites, even if the infrastructures are incompatible and do not intercommunicate. The user then keeps the device 1 on his or her person. One can picture the device 1 as a set of electronic keys. In one variant, such a device 1 may be loaned to a visitor upon his or her arrival at a site and turned in when the user leaves. In this last case, the identification data may be loaded (stored) on the device 1 even before the visitor's arrival and deleted or updated after his or her departure to be reused by another visitor.

In the above description, embodiments of the device 1 have been described. The operations implemented by the processing unit 130 may also be viewed as a method implemented by computer means. Such a method represents another aspect of the invention. Such a method may take the form of a computer program comprising instructions for the implementation of the method by a processor or by the processing unit 130. Such a program may be stored in a non-transitory computer-readable storage medium, for example one of the storage members of the device 1.

The invention is not limited to the exemplary devices, methods, programs, and non-transitory storage media described above solely by way of example, but encompasses all the variants that a person skilled in the art can envisage within the scope of the protection sought.

The invention claimed is:

1. A personal identification device for physical access control systems, comprising:
   a body in which is provided a housing of shapes and dimensions suitable for receiving at least one identification badge, a window being provided in the body such that visual information carried by a badge placed in the housing remains at least partially visible through the window;
   at least one reader configured to read data from an identification badge, said data including at least personal identification data;
   a processing unit;
   a data storage member;
   at least one wireless communication module; and
   an internal battery configured to supply power to the components of the device,
   the processing unit being configured to:
      acquire data from at least one identification badge by means of the reader,
      store the acquired data in the data storage member, so that said data remain stored independently of the subsequent accessibility of said identification badge by the reader, then if the acquired data are encrypted, decrypt the data, then transmit at least a portion of the acquired data to a reader external to the device, via the wireless communication module and on request from said reader external to the device.

2. The device according to claim 1, formed as a wearable object.

3. The device according to claim 2, further comprising:
an electronic paper screen, controlled by the processing unit.

4. The device according to claim 2, wherein:
the at least one reader includes a radio tag reader or a magnetic stripe reader, or
the at least one wireless communication module includes a magnetic stripe, a radio tag, a near-field communication module, a very short range communication module, or a combination of such elements.

5. The device according to claim 2, wherein the processing unit is further configured to encrypt the data stored in the data storage member.

6. The device according to claim 2, further comprising:
an induction loop, such that the battery is rechargeable by induction.

7. The device according to claim 2, further comprising:
an interface connected to the processing unit and user-activatable, the processing unit being further configured to trigger the sending of a signal via at least one wireless communication module in response to activation of said interface.

8. The device according to claim 1, further comprising:
an electronic paper screen, controlled by the processing unit.

9. The device according to claim 8, wherein:
the at least one reader includes a radio tag reader or a magnetic stripe reader, or
the at least one wireless communication module includes a magnetic stripe, a radio tag, a near-field communication module, a very short range communication module, or a combination of such elements.

10. The device according to claim 8, wherein the processing unit is further configured to encrypt the data stored in the data storage member.

11. The device according to claim 8, further comprising:
an induction loop, such that the battery is rechargeable by induction.

12. The device according to claim 1, wherein:
the at least one reader includes a radio tag reader or a magnetic stripe reader, or
the at least one wireless communication module includes a magnetic stripe, a radio tag, a near-field communication module, a very short range communication module, or a combination of such elements.

13. The device according to claim 12, wherein the processing unit is further configured to encrypt the data stored in the data storage member.

14. The device according to claim 12, further comprising:
an induction loop, such that the battery is rechargeable by induction.

15. The device according to claim 1, wherein the processing unit is further configured to encrypt the data stored in the data storage member.

16. The device according to claim 15, further comprising:
an induction loop, such that the battery is rechargeable by induction.

17. The device according to claim 1, further comprising:
an induction loop, such that the battery is rechargeable by induction.

18. The device according to claim 1, further comprising:
an interface connected to the processing unit and user-activatable, the processing unit being further configured to trigger the sending of a signal via at least one wireless communication module in response to activation of said interface.

19. A method for aggregating personal identifiers on a device for physical access control systems and implemented by computer means, said device including a body in which is provided a housing of shapes and dimensions suitable for receiving at least one identification badge, a window being provided in the body such that visual information carried by a badge placed in the housing remains at least partially visible through the window, said method comprising:
acquiring data from at least one identification badge by means of a reader, said data including at least personal identification data;
storing the acquired data in a data storage member, such that said data remain stored independently of subsequent accessibility of said identification badge by the reader; then
if the acquired data are encrypted, decrypting the data; and
transmitting at least a portion of the acquired data to a reader external to the device, via a wireless communication module and in response to a request received from said reader external to the device.

20. A non-transitory computer-readable medium on which is stored a computer program comprising instructions that, when executed by a processor, cause the processor to implement the method according to claim 19.

* * * * *